(12) United States Patent
Imatomi et al.

(10) Patent No.: US 7,147,199 B2
(45) Date of Patent: Dec. 12, 2006

(54) MOLD AND A METHOD FOR MANUFACTURING THE SAME

(75) Inventors: Yoshiyuki Imatomi, Tomisato (JP); Tatsuro Araki, Niihama (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 203 days.

(21) Appl. No.: 10/442,098

(22) Filed: May 21, 2003

(65) Prior Publication Data

US 2003/0222376 A1    Dec. 4, 2003

(30) Foreign Application Priority Data

May 31, 2002  (JP)  .............................. 2002-160544

(51) Int. Cl.
*B29D 11/00*  (2006.01)
(52) U.S. Cl. .................... 249/114.1; 425/542; 425/808
(58) Field of Classification Search ............. 249/114.1, 249/116, 134, 135; 425/542, 810
See application file for complete search history.

(56) References Cited

U.S. PATENT DOCUMENTS

| | | | |
|---|---|---|---|
| 5,064,597 A | | 11/1991 | Kim |
| 5,227,235 A | | 7/1993 | Moro et al. |
| 5,458,818 A | * | 10/1995 | Kim et al. .................. 264/1.33 |
| 6,276,656 B1 | * | 8/2001 | Baresich ....................... 249/79 |
| 6,517,339 B1 | * | 2/2003 | Miya et al. .................. 425/542 |

FOREIGN PATENT DOCUMENTS

| | | |
|---|---|---|
| DE | 100 22 114 A1 | 11/2001 |
| EP | 1 027 946 A2 | 8/2000 |
| GB | 2 362 156 A | 11/2001 |
| JP | 10-000626 | 1/1998 |
| WO | WO 00/53386 | * 9/2000 |

OTHER PUBLICATIONS

English abstract for JP 10-000626.*

* cited by examiner

*Primary Examiner*—Donald Heckenberg
(74) *Attorney, Agent, or Firm*—Squire, Sanders & Dempsey, LLP (57) ABSTRACT

A mold includes a mold insert body made of at least two kinds of materials. The materials have different coefficients of thermal conductivity. The mold insert body includes a union part formed by sintering the materials, and the union part has a configuration set so as to correspond to a cooling way of a molding material flowed in a cavity forming part of the mold.

13 Claims, 8 Drawing Sheets

MOLD AND A METHOD FOR MANUFACTURING THE SAME

BACKGROUND OF THE INVENTION

1. Field of the Invention

The present invention relates to molds and methods for manufacturing the same.

2. Description of the Related Art

In an injection molding machine of the related art, resin heated and melted in a heating cylinder is injected into a cavity of a mold apparatus under high pressure so that the cavity is filled with the molten resin. The molten resin is then cooled and solidified so as to obtain a molded article.

The injection molding machine includes an injection apparatus, a mold clamping apparatus and the mold apparatus. The mold apparatus is provided with a stationary mold and a movable mold. The mold clamping apparatus includes a stationary platen, a movable platen, a motor for mold clamping, and others. The movable platen is advanced and retracted against the stationary platen by driving a motor for mold clamping, so as to perform mold closing, mold clamping and mold opening.

The injection apparatus includes a heating cylinder and an injection nozzle. The resin supplied from a hopper is heated and melted by the heating cylinder. The molten resin is injected by the injection nozzle. A screw is disposed inside the heating cylinder so that the screw can be rotated about an axis and can be advanced and retracted. The screw is advanced by driving a motor for injection so that the resin is injected by the injection nozzle. The screw is rotated by driving a motor for metering and thereby the screw is retracted and the resin is metered.

Meanwhile, in a case where precision parts such as a disk shaped substrate, a lens made of plastic, and the like are molded as a molded article, the quality of the molded article is determined based on the cavity space of the mold apparatus. Because of this, the mold apparatus is required to have high precision for various measurements of the mold apparatus. Hence, the mold is manufactured by the following method.

It is noted that the molds (the stationary mold and the movable mold) forming the mold apparatus have not only the mold bodies such as the cavity and a core but also a mold insert body or a mold core body provided with the mold body if necessary. Hence, in this specification, the "mold" is a general term of the mold body, the mold core body, and the mold insert body. In a case where a disk shaped substrate is molded, a stamper is used as the mold insert body.

Figure 1:
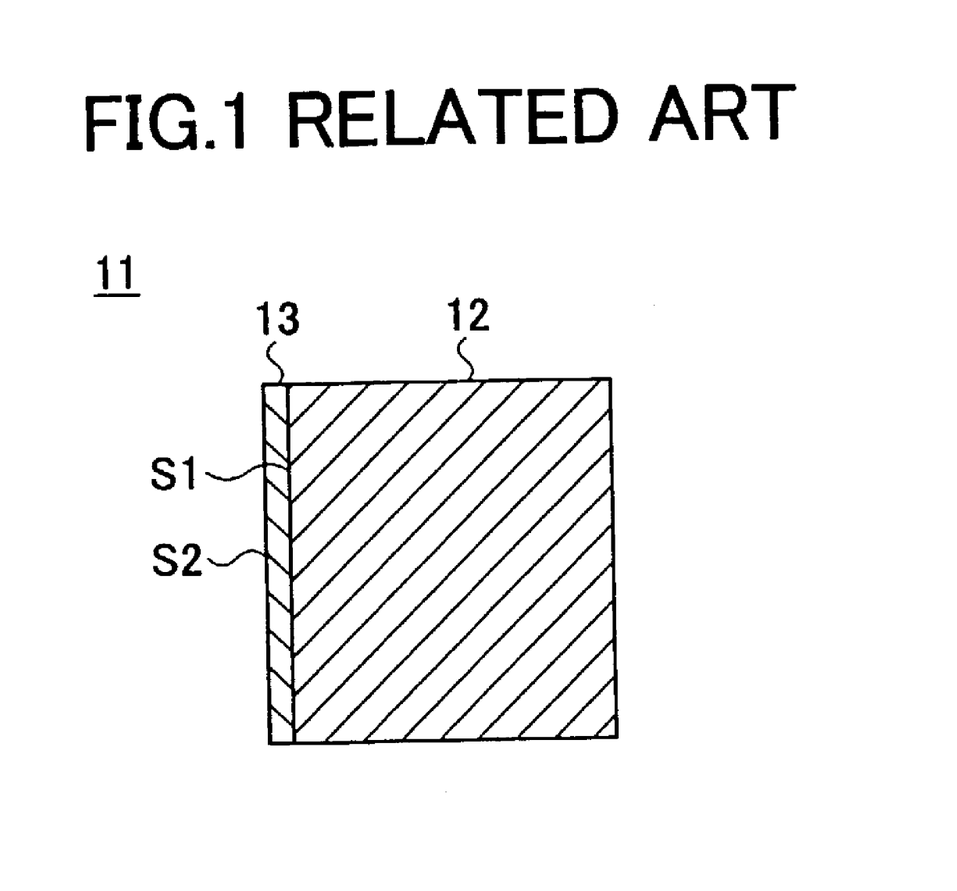
FIG. 1 is a vertical cross-sectional view of a mold of the related art.

FIG. 1 is a vertical cross-sectional view of a mold of the related art.

Referring to FIG. 1, the mold insert body 11 forming a part of the mold includes a mold prototype 12 and a nickel-phosphorus plating layer 13. The mold prototype 12 is a prototype of the mold insert body 11.

The mold insert body 11 is manufactured by the following steps. In the first step, a base material blank made of steel material such as SKD 61 including chrome of approximately 2–5% is formed. In the second step, rough processing is performed on the base material as having an error range of 20–200 [μm] so that the mold prototype 12 is formed. Next, in the third step, hardening and tempering are performed on the mold prototype 12.

In the fourth step, electroless nickel-phosphorus plating is performed on a mold surface S2 forming at least the cavity space of the mold prototype 12. As a result of this, a plating layer having a thickness of at least 100–200 [μm], namely the nickel-phosphorus plating layer 13, is formed.

In the fifth step, a heat treatment at a temperature of 300–400 degrees centigrade is performed, so that stress of the nickel-phosphorus plating layer 13 is removed and hardness (HRC) of 50–54 is set.

In the sixth step, external diameter processing is performed against the entire mold prototype 12 using a grindstone so that a reference plane is formed. After that, in the seventh step, rough configuration processing is performed on the nickel-phosphorus plating layer 13 by diamond bit cutting so that a cavity forming surface is produced. In the eighth step, a finishing process is performed on the nickel-phosphorus plating layer 13 of the cavity forming surface by diamond bit cutting so that the mold is finished.

In this case, the surface layer of the nickel-phosphorus plating layer 13 is amorphous. Therefore, as compared with a case where the finishing processing is performed on a part being in a crystalline state by the diamond bit cutting, a step due to the crystalline interface is not required to be included in the above mentioned steps. Hence, it is possible to manufacture the mold with high precision.

In a case where the disk shaped substrate as the molded article is molded by using the mold insert body 11 of the above mentioned related art, for example, the mold insert body 11 is set to the mold apparatus as a mold insert body (stamper) where a pattern of a hyperfine convex-concave is formed on the mold surface S2 thereof. The resin fills the cavity of the mold apparatus so that the pattern formed on the mold surface S2 is transferred to the resin. The resin is then cooled so that a prototype substrate is formed. At this time, the pattern is transferred to the prototype substrate.

And then, heat of the resin filling the cavity at the time of filling is transmitted to the mold prototype 12 via the nickel-phosphorus plating layer 13. In this case, the nickel-phosphorus plating layer 13 generally has a small thickness of 100–200 [μm]. Hence, the heat of the resin is transmitted to the mold prototype 12 immediately so that the temperature of the resin inside of the cavity-space is reduced rapidly. Accordingly, the pattern cannot be transferred to the resin precisely. As a result of this, it is not possible to form a disk shaped substrate with high precision and therefore quality of the molded article is degraded.

Furthermore, in the fourth step of the method for manufacturing the mold insert body 11, electroless nickel-phosphorus plating is performed on the surface forming at least the cavity of the mold prototype 12. However, work for electroless nickel-phosphorus plating not only is extremely troublesome but also takes a lot of time for manufacturing. Hence, the electroless nickel-phosphorus plating causes an increase of the manufacturing cost of the mold.

That is, in a case where the electroless nickel-phosphorus plating is performed, first a plating processing is performed on the mold prototype 12 in a plating bath after an ultrasonic cleaning, masking, striking treatment, or the like is performed. After that, the mold prototype 12 is cleaned. Thus, a lot of steps are necessary for electroless nickel-phosphorus plating.

Furthermore, in the above mentioned plating treatment, not only is the amount of the nickel-phosphorus adhering to the prototype mold 12 per unit time extremely small, but also the processing based on diamond bit cutting is required in the seventh and eighth steps. Because of this, since the nickel-phosphorus plating layer 13 is required to have a film thickness of at least 100–200 [μm], it takes an extremely long time to form the nickel-phosphorus plating layer 13.

In addition, not only is it easy for bubbles to enter the nickel-phosphorus plating layer 13 at the time of forming the nickel-phosphorus plating layer 13, but also it is easy for the nickel-phosphorus plating layer 13 to peel off and have a strain generated at the time of heat treatment of the nickel-phosphorus plating layer 13 in the fifth step. In the above mentioned case, it is not possible to manufacture the mold with a high precision, so that the yield rate becomes low.

Furthermore, in the plating treatment, there is a restriction of the composition of a plating liquid filling the plating bath. In addition, in a case where a steel material including chrome of approximately 13% is used as the base material blank, it is not possible to perform electroless plating on the base material blank and there is a restriction of the material of the base material blank. Therefore, it is difficult to manage manufacturing conditions of the mold.

SUMMARY OF THE INVENTION

Accordingly, it is a general object of the present invention to provide a novel and useful mold and a method for manufacturing the same, in which one or more of the problems described above are eliminated.

Another and more specific object of the present invention is to provide a mold and a method for manufacturing the same whereby the quality of the molded articles can be improved, the manufacturing cost of the mold can be reduced, the mold can be manufactured with high precision, the yield rates can be improved and the manufacturing condition of the mold can be managed easily.

It is also an object of the present invention to provide a mold, including a mold insert body made of at least two kinds of materials, the materials having different coefficients of thermal conductivity. The mold insert body includes a union part formed by sintering the materials. The union part has a configuration set so as to correspond to a cooling way of a molding material flowed in a cavity forming part of the mold.

It is also an object of the present invention to provide a mold, including a mold insert body, the mold insert body including: a base layer that is made of a first material; and an outermost layer that is made of a second material different from the first material of the base layer and that forms a cavity forming part. A union part is formed by sintering the base layer and the outermost layer. The union part has a configuration set so as to correspond to a cooling way of a molding material flowed in the cavity forming part of the mold.

It is also an object of the present invention to provide a method for manufacturing a mold, including the steps of:

a) providing a powder of a first material;

b) providing a powder of a second material different from the powder of the first material so as to form a configuration that corresponds to a cooling way of a molding material flowed in a cavity forming part of the mold; and c) sintering the respective powders by putting the powders of the respective materials between a first electrode and a second electrode, by pressuring with a designated pressure power, and by sending a designated electric current to the powders of the respective materials.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 2 through 13, of embodiments of the present invention. In the following examples, a mold and a manufacturing method of the same whereby precision parts such as a disk shaped substrate, a lens made of plastic, and the like are molded as a molded article, will be described.

Figure 2:
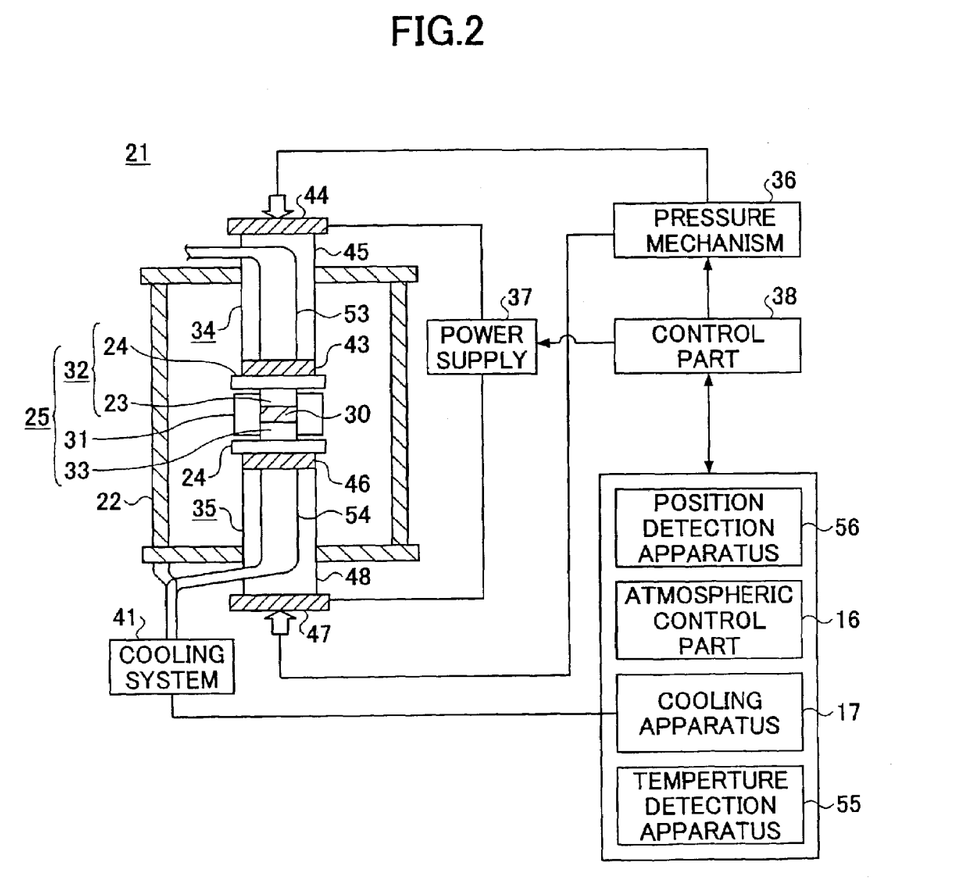
FIG. 2 is a schematic view showing a manufacturing apparatus of a mold of a first embodiment of the present invention.
Figure 3:
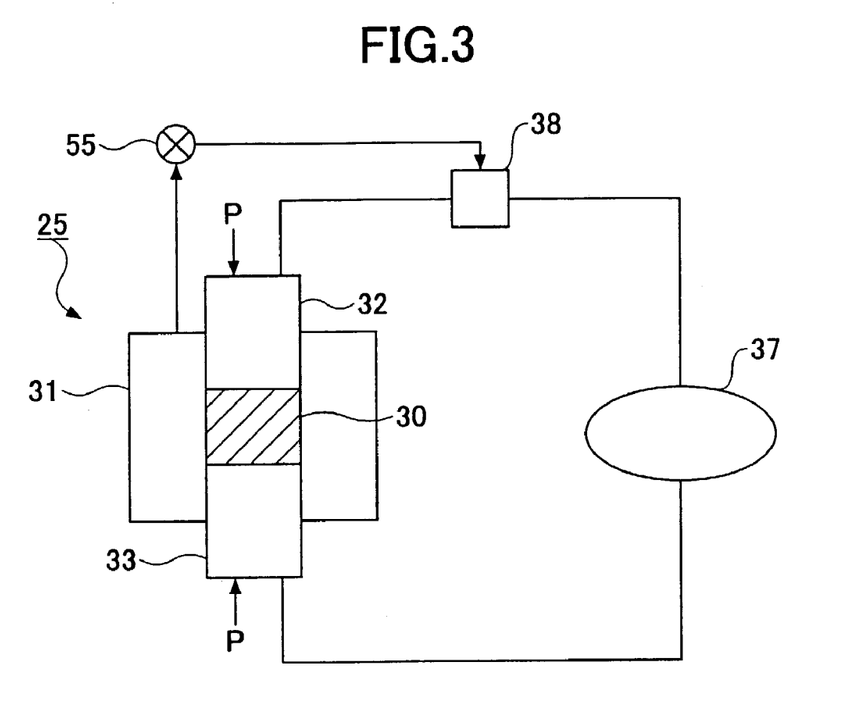
FIG. 3 is a schematic view showing a manufacturing method of the mold of the first embodiment of the present invention.

FIG. 2 is a schematic view showing a manufacturing apparatus of a mold of a first embodiment of the present invention. FIG. 3 is a schematic view showing a manufacturing method of the mold of the first embodiment of the present invention.

Referring to FIG. 2, a discharge plasma sintering apparatus 21 used for manufacturing the mold of the first embodiment of the present invention includes a housing 22 which has a cylindrical configuration and is sealed. A chamber in the housing 22 is connected to a vacuum pump (not shown) as a vacuum generation source provided at an atmospheric control part 16. The chamber is evacuated by driving the vacuum pump. Instead of maintaining a vacuum inside of the housing 22, inactive gas such as argon gas and the like may fill the inside of the housing 22. In addition, a cooling pipe (not shown, is provided inside of a wall of the housing 22. Cooling water as a cooling medium (not shown) circulates inside of the cooling pipe so that the chamber is cooled. Because of this, the cooling pipe is connected to a cooling apparatus 17 via a cooling system 41. The cooling water is supplied from the cooling system 41 via the cooling pipe.

A die 31 is provided inside of the housing 22. The die 31 has a cylindrical configuration and is made of conductive material such as graphite. An upper punch 32 having a stick configuration and made of a conductive material such as graphite is provided over the die 31 as a first punch. A lower punch 33 having a stick configuration and made of a conductive material such as graphite is provided below the die 31 as a second punch. The upper punch 32 and the lower punch 33 are provided as facing each other. A sinter mold 25 consists of the die 31, the upper punch 32 and the lower punch 33.

A punch body part 23 is formed so as to project to the inside of the die 31. Pushing pressure parts 24 having flange configurations are formed at the upper end of the upper punch 32 and the lower end of the lower punch 33 in a body with the punch body part 23.

In the present embodiment, the die 31, the upper punch 32, and the lower punch 33 are made of graphite. However, instead of graphite, another conductive material having a melting point of 1100 degrees centigrade or more, such as tungsten (W), molybdenum (Mo), or carbon (C), may be used for the die 31, the upper punch 32, and the lower punch 33.

An upper electrode 34 as a first electrode is provided over the upper punch 32 as extending in the vertical direction. A lower electrode 35 as a second electrode is provided below the lower punch 33 as extending in the vertical direction.

The upper electrode 34 has an electrode terminal 43, an electrode terminal 44, and a body part 45. The electrode terminal 43 is provided at the lower end of the upper electrode 34 and comes in contact with the upper punch 32. The electrode terminal 44 is provided at the upper end of the upper electrode 34 and connected to a direct current power supply 37. The electrode terminals 43 and 44 are connected by the body part 45. The body part 45 is formed so as to pierce into the housing 22.

The lower electrode 35 has an electrode terminal 46, an electrode terminal 47, and a body part 48. The electrode terminal 46 is provided at the upper end of the lower electrode 35 and comes in contact with the lower punch 33. The electrode terminal 47 is provided at the lower end of the lower electrode 35 and connected to the direct current power supply 37. The electrode terminals 46 and 47 are connected by the body part 48. The body part 48 is formed so as to pierce into the housing 22.

Cooling pipe 53 is provided inside of the upper electrode 34 and cooling pipe 54 is provided inside of the lower electrode 35.

Cooling water circulates inside of the cooling pipes 53 and 54 so as to cool the upper electrode 34 and the lower electrode 35 and cool the die 31 indirectly via the upper punch 32 and the lower punch 33. A temperature sensor (not shown) as a temperature detection part is provided at a designated part of the die 31. Output from the temperature sensor is sent to a temperature detection apparatus 55. Therefore, it is possible to detect temperatures of the die 31, the upper electrode 34 and the lower electrode 35 by the temperature detection apparatus 55.

The upper electrode 34 and the lower electrode 35 are provided so as to be able to move in up and down directions. A pressure mechanism 36 is connected to an upper end part of the upper electrode 34 and a lower end part of the lower electrode 35. Pressure P generated by the pressure mechanism 36 is transmitted to the upper electrode 34 and the lower electrode 35. By the pressure P, the upper electrode 34 is moved in a downward direction and the lower electrode 35 is moved in the upward direction.

Powder 30 for sintering is provided inside of the die 31. By driving the pressure mechanism 36 so as to move the upper electrode 34 and the lower electrode 35, the power 30 for sintering is pressured with the pressure P. A servo motor, a reduction gear, a hydraulic cylinder, an air pressure cylinder and the like may be used as a driving part (not shown) of the pressure mechanism 36.

In order to detect positions of the upper electrode 34 and the lower electrode 35, a position sensor (not shown) as a position detection part is provided so as to be adjacent to the upper electrode 34 and the lower electrode 35. A sensor output of the position sensor is sent to the position detection apparatus 56. Hence, it is possible to detect the positions of the upper electrode 34 and the lower electrode 35 by the position detection apparatus 56.

In this embodiment, the upper electrode 34 and the lower electrode 35 are provided so as to be able to move and the powder 30 for sintering is pressured by moving the upper electrode 34 and the lower electrode 35. However, the powder 30 for sintering may be pressured by fixing one of the upper electrode 34 and the lower electrode 35, and moving the other of the upper electrode 34 and the lower electrode 35.

A designated pressure P is generated by the pressure mechanism 36. A control part 38 is provided in order to transmit the pressure to the upper electrode 34 and the lower electrode 35 and generate a designated voltage with a designated pulse by the power supply 37. The control part 38 is connected to the pressure mechanism 36 and the power supply 37. The control part 38 is also connected to the atmospheric control part 16, the cooling apparatus 17, the temperature detection apparatus 55, and the position detection apparatus 56.

Based on a temperature detected by the temperature detection apparatus 55 and a position detected by the position detection apparatus 56, the pressure P based on the pressure mechanism 36 is feed-back controlled and a pulse width, a voltage and the like based on the power supply 37 is feed-back controlled. Furthermore, the cooling apparatus 17 is driven based on temperature, and the temperatures of the upper electrode 34 and the lower electrode 35 are feed-back controlled.

In a case where discharge plasma sintering is performed by the discharge plasma sinter apparatus 30 having the above mentioned structure, first, the upper electrode 34 is moved in an upper direction. As a result of this, the upper punch 32 is moved in the upward direction so as to open the upward end of the die 31. Because of this, a filling room having a closed bottom formed by the die 31 and the lower punch 33 is provided by the powder 30 for sintering made of a designated material Next, the upper punch 32 and the upper electrode 34 are moved in the downward direction and the filling room is sealed. After that, pressure treatment means of the control part 38 perform a pressure treatment. That is, the pressure mechanism 36 is operated and the upper electrode 34 and the lower electrode 35 are moved, so that the powder 30 for sintering is pressured by the designated pressure P.

Voltage application treatment means of the control part 38 perform a voltage application treatment. That is, the power supply 37 is operated so that a electrifying pulse is provided between the upper electrode 34 and the lower electrode 35 for approximately 10 minutes. That is, for example, a voltage of 0.1–5 [V] is applied and pulse direct electrical current of approximately 1000–8000 [A] is flowed between the upper electrode 34 and the lower electrode 35. Thus, in this embodiment, the pulse direct electrical current is flowed. However, rectangular wave electrical current, triangular wave electrical current, trapezoidal wave electrical current, and the like may be flowed and alternating electrical current may be flowed. Furthermore, electrical current having the same value may be flowed for a designated time.

Because of this, the powder 30 for sintering is heated so as to have a temperature of approximately 500–3000 [° C.]. As a result of this, the powder 30 for sintering is sintered by discharge plasma sintering so that the powder 30 for sintering becomes a sintered body. In this case, heat is generated at a point where respective powders forming the powder 30 for sintering contact each other, and thereby respective powders are connected. Although a designated binder is applied to the powder 30 for sintering in order to provide good handleability of the powder 30 for sintering, the binder is blown off when the pulse electric current is flowed.

In this case, a first electrifying path, a second electrifying path, and a third electrifying path are formed. The first electrifying path includes the upper electrode 34—the upper puch 32—the powder 30 for sintering—the lower punch 33—the lower electrode 35. The second electrifying path includes the upper electrode 34—the upper puch 32—the die 31—the lower punch 33—the lower electrode 35. The third electrifying path includes the upper electrode 34—the upper puch 32—an interface of powder for sintering and die (an interface of the powder 30 for sintering and the die 31)—the lower punch 33—the lower electrode 35. It is possible to sinter the powder 30 for sintering properly by controlling the electric current flowing through the first electrifying path, the second electrifying path, and the third electrifying path properly.

Next, soon after that, the die 31, the upper punch 32, and the lower punch 33 are heated by Joule heat so that the temperature of the sintered body is maintained. And then, the sintered body is cooled by cooling water supplied from the cooling system 41 so that the mold is completed. At this time, time for maintaining the temperature of the sintered body is set as approximately 10–30 minutes and time for cooling the sintered body is set as approximately 30 minutes.

And then, the upper punch 32 and the upper electrode 34 are raised and the mold is taken off from the filling room.

Next, a mold manufactured by the above mentioned discharge plasma sintering apparatus 21 will be described.

Figure 4:
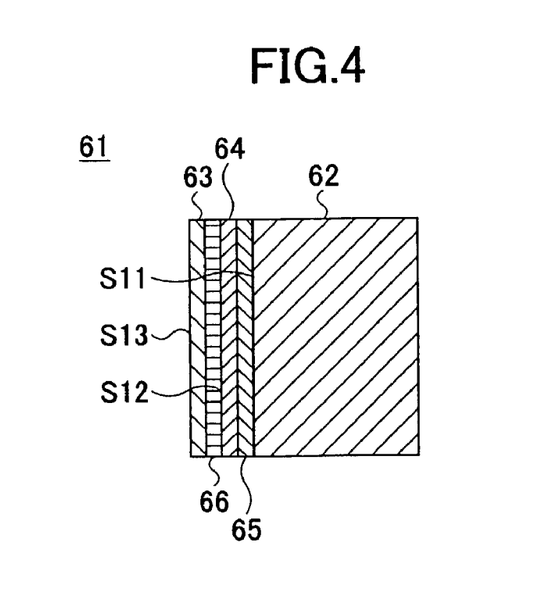
FIG. 4 is a vertical cross-sectional view of the mold of the first embodiment of the present invention.

FIG. 4 is a vertical cross-sectional view of the mold of the first embodiment of the present invention.

Referring to FIG. 4, a mold insert body 61 is formed by at least two layers having different coefficients of thermal conductivity (in this embodiment, five layers having different coefficients of thermal conductivity). The mold insert body 61 forms a part of the mold. The mold insert body 61 includes a base layer 62, an outermost layer 63, an adiabatic layer 64, a first inclination layer 65, and a second inclination layer 66.

The base layer 62 is made of a stainless steel group steel material. The base layer 62 functions as a first layer having a union surface S11 that is plane. The outermost layer 63 is positioned at the outermost of the mold insert body 61. The outermost layer 63 functions as a second layer forming a mold surface S13 that is plane and as a cavity forming part. The adiabatic layer 64 is formed between the base layer 62 and the outermost layer 63. The adiabatic layer 64 is made of a material having a low coefficient of thermal conductivity such as ceramic. The adiabatic layer 64 functions as a third layer having a union surface S12 that is plane and as an intermediate layer. The first inclination layer 65 is formed between the base layer 62 and the adiabatic layer 64. The second inclination layer 66 is formed between the outermost layer 63 and the adiabatic layer 64.

In this embodiment, neighboring layers of the base layer 62, the outermost layer 63, the adiabatic layer 64, the first inclination layer 65 and the second inclination layer 66 are connected by sintering. The adiabatic layer 64 is formed so as to have a constant thickness in a diameter direction and an axial direction. Here, the union surface S11 forms a union part between the base layer 62 and the adiabatic layer 64. The union surface S12 forms a union part between the adiabatic layer 64 and the outermost layer 63.

In this embodiment, the base layer 62 is made of SUS 304 as a first material. The outermost layer 63 is made of pure nickel as a second material. The adiabatic layer 64 is made of zirconia (zirconium oxide: $ZrO_2$) as a third material.

The base layer 62 may be made of copper (Cu), titanium (Ti), and the like instead of SUS 304. The outermost layer 63 may be formed aluminum (Al), copper (Cu), and the like instead of pure nickel. The adiabatic layer 64 may be made of alumina (aluminum oxide: $Al_2O_3$) instead of zirconia.

It is preferable for a material forming the outermost layer 63 to have a melting point of 400 [° C.] or more, a deep cutting tab, good mirror plane characteristics and mold release characteristics, and resistance to forming a pin hole.

In this embodiment, the adiabatic layer 64 is provided between the outermost layer 63 and the base layer 62. Hence, heat of the resin filling the cavity space C is gradually transmitted to a receiving plate 75 (See FIG. 6) of the mold apparatus 71 via the outermost layer 63, the second inclination layer 66, the adiabatic layer 64, the first inclination layer 65, and the base layer 62.

Figure 5:
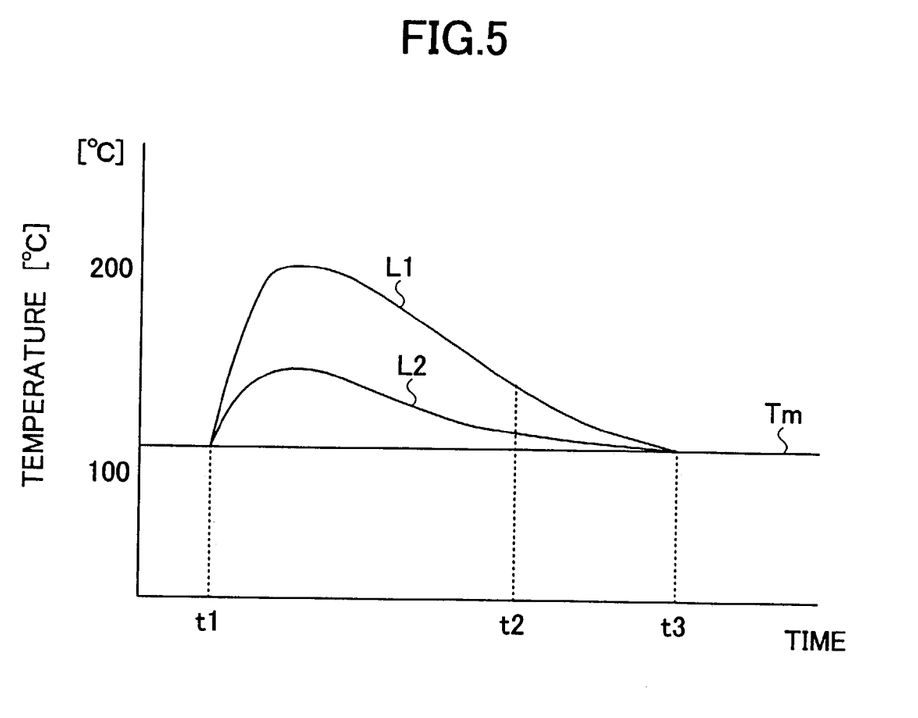
FIG. 5 is a graph showing a specific characteristic of the mold of the first embodiment of the present invention.

FIG. 5 is a graph showing a specific characteristic of the mold of the first embodiment of the present invention. In FIG. 5, the horizontal axis represents time and the vertical axis represents temperature. In this case, since copper has a high coefficient of thermal conductivity, it is possible to improve the cooling effect by using copper for the base layer 62.

Referring to FIG. 5, L1 represents a change of the temperature of the mold surface S13 in a case where resin fills the cavity space C by using the mold insert body 61 (See FIG. 4) forming a part of the mold of the present invention. L2 represents a change of the temperature of the mold surface S2 in a case where resin fills the cavity space C by using the mold insert body 11 (See FIG. 1) forming a part of the mold of the related art. Tm represents temperatures of the mold prototype 12 and the base layer 62.

In the mold insert body 11 of the related art shown in FIG. 1, if the resin fills the cavity space C (See FIG. 6) at a timing of t1, heat of the resin filling the cavity space C is transmitted to the mold prototype 12. The temperature of the mold surface S2 is reduced rapidly. The molded article is taken at a timing of t2. The timing of t2 is a timing when a cooling step finishes without sufficient rise of the temperature of the resin in the cavity space C. After that, when the temperature of the mold surface S2 is matched with the temperature Tm of the mold prototype 12 at a timing of t3, the next step, namely the filling step, starts.

Figure 6:
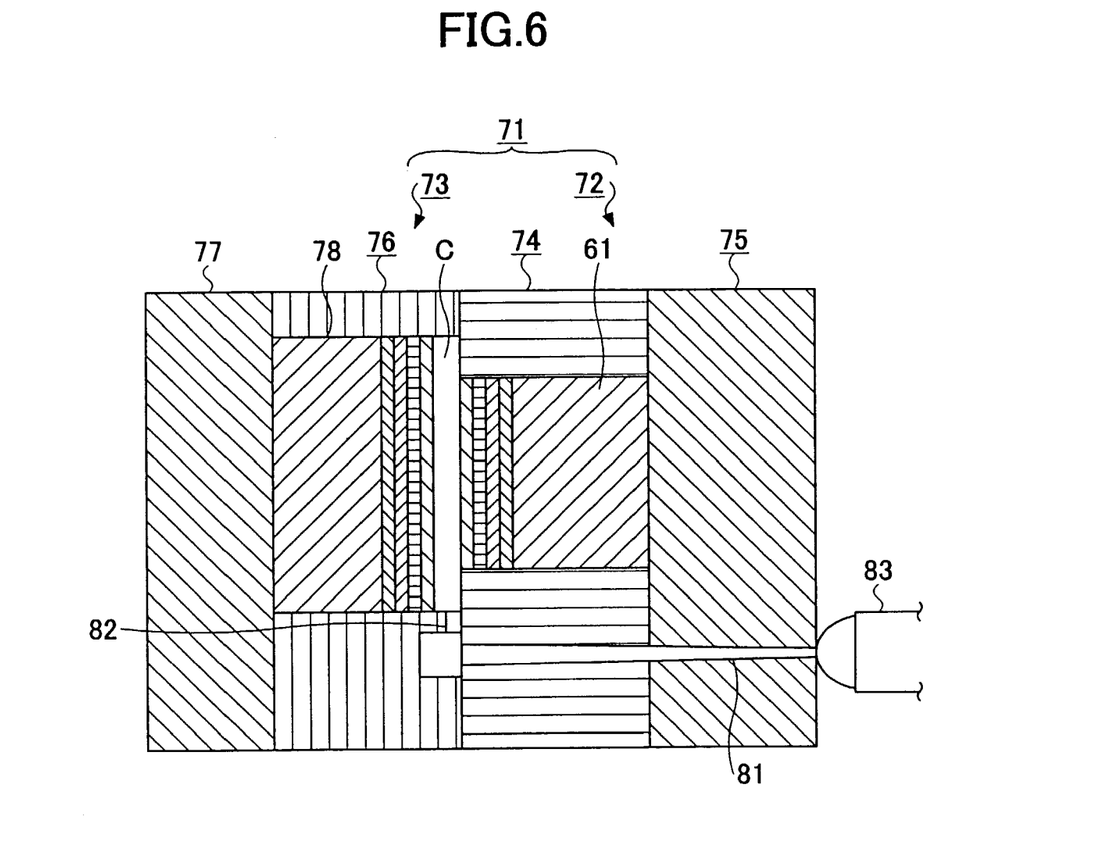
FIG. 6 is a cross-sectional view showing a main part of a mold apparatus and an injection apparatus of the first embodiment of the present invention.

In the mold insert body 61 forming the mold of the present invention shown in FIG. 4, since the adiabatic layer 64 is formed, when the resin fills the cavity space C at a timing of t1, heat of the resin filling the cavity space C is not rapidly transmitted to the base layer 62 but a temperature of the mold surface S13 rises due to the heat of the resin. And then, the mold apparatus 71 shown in FIG. 6 is cooled. Since the base layer 62 is made of copper, the mold surface S13 is then cooled rapidly so that the molded article is taken off at the timing of t2. After that, when the temperature of the mold surface S13 is matched with the temperature Tm of the base layer 62 at a timing of t3, a next step, namely the filling step, starts.

Thus, in a case where the mold insert body 61 forming the mold of the present invention shown in FIG. 4 is used, the temperature of the mold surface S13 can be raised just after the resin fills. Accordingly, the pattern can be transferred to the mold surface S13 with high precision so that the quality of the disk shaped substrate can be improved.

Furthermore, by using copper as a base material of the base layer 62, it is possible rapidly reduce the temperature of the mold surface S13 that is raised by the resin just after the resin fills. Hence, it is possible to increase the temperature of the mold surface S13 without making the molding cycle longer so that the quality of the disk shaped substrate can be improved.

Meanwhile, although the base layer 62 and the outermost layer 63 are made of metal, the adiabatic layer 64 is made of ceramic material. Therefore, if the base layer 62 and the outermost layer 63 and the adiabatic layer 64 are connected directly, undesirable stress is generated at the union parts due to changes of temperature so that connection characteristics becomes worse. Hence, the first inclination layer 65 formed between the base layer 62 and the adiabatic layer 64 is made of the materials forming the base layer 62 and the adiabatic layer 64. In addition, the second inclination layer 66 formed between the outermost layer 63 and the adiabatic layer 64 is made of materials forming the outermost layer 63 and the adiabatic layer 64.

In this embodiment, the first inclination layer 65 includes SUS 304 as 50 [mass %] and zirconia as 50 [mass %].

The second inclination layer 66 includes the pure nickel as 50 [mass %] and zirconia as 50 [mass %].

Accordingly, it is possible to improve connection characteristics of the base layer 62, the outermost layer 63, and the adiabatic layer 64. In addition, peeling of the adiabatic layer 64 off the base layer 62 and the outermost layer 63 can be prevented.

Next, a mold apparatus for molding the disk shaped substrate wherein the mold insert body 61 has the above structure will be described.

FIG. 6 is a cross-sectional view showing a main part of a mold apparatus and an injection apparatus of the first embodiment of the present invention.

Referring to FIG. 6, the mold apparatus 71 includes a stationary mold 72 and a movable mold 73. The movable mold 73 can make contact with and separate from the stationary mold 72 by means of a mold clamping apparatus not shown. By contacting and separating of the movable mold 73, mold closing, mold clamping and mold opening are performed. At the time of mold closing and mold clamping, the cavity C is formed between the stationary mold 72 and the movable mold 73.

The stationary mold 72 includes a mold plate 74 and a receiving plate 75. The mold insert body 61 is set to the mold plate 74. The movable mold 73 includes a mold plate 76 and a receiving plate 77. The mold insert body 78 is set to the mold plate 76. Here, the mold insert body 78 has a same structure as the mold insert body 61.

In the stationary mold 72, a sprue 81 is formed by piercing the receiving plate 75 and the mold plate 74. An injection nozzle 83 of the injection apparatus comes in contact with the stationary mold 72. When the resin is injected from the injection nozzle 83, the resin fills the cavity C via the gate 82 formed at the mold plate and via the sprue 81. The resin in the cavity C is then cooled so as to become a prototype substrate. After that, opening hole processing is performed against the prototype substrate by a cut punch not shown so that the disk shaped substrate can be obtained.

Next, referring to FIG. 3, a method for manufacturing the mold insert bodies 61 and 78 by using the discharge plasma sinter apparatus 21 shown in FIG. 2 will be described. Since the mold insert body 78 has the same structure as the mold insert body 61, explanation of the mold insert body 78 will be omitted and the only mold insert body 61 will be described.

In this embodiment, as described above with reference to FIG. 4, the mold insert body 61 has a laminated body structure wherein the base layer 62, the first inclination layer 65, the adiabatic layer 64, the second inclination layer 66 and the outermost layer 63 are stacked.

A powder P (See FIG. 2) for sintering is provided in the filling room of the discharge plasma sintering apparatus 21 shown in FIG. 2. The powder P (See FIG. 2) for sintering is formed by a multilayer powder corresponding to the base layer 62, the first inclination layer 65, the adiabatic layer 64, the second inclination layer 66 and the outermost layer 63, shown in FIG. 4, respectively. In this embodiment, the-base layer 62, the first inclination layer 65, the adiabatic layer 64, the second inclination layer 66 and the outermost layer 63 are formed by sintering powders. However, a plate material or a solid such as a block, having designated layers, may be formed.

First, the upper punch 32 and the upper electrode 34 are raised so that SUS 304 powder as a first powder is provided in the filling room so as to have a designated thickness. Next, a second powder is provided on the first powder. The second powder is a mix powder made by mixing the SUS 304 powder as 50 [mass %] and zirconia as 50 [mass %], so as to have a designated thickness.

After that, zirconia powder as a third powder is provided on the second powder so as to have a desirable thickness. And then, a mix powder wherein pure nickel powder as 50 [mass %] and zirconia powder as 50 [mass %], as a fourth powder, are mixed is provided on the third powder so as to have a designated thickness.

And then, last, pure nickel powder as a fifth powder, is provided on the forth powder so as to have a designated thickness.

Thus, the first through fifth powder layers are formed by the first through fifth powders, and powder 30 for sintering formed by a multilayer powder of the first through fifth powder layers is formed.

Next, the upper punch 32 and the upper electrode 34 are lowered and discharge plasma sintering is performed on the powder 30 for sintering, so that the mold insert body 61 is formed in a body. Next, the upper punch 32 and the upper electrode 34 are raised so that the mold insert body 61 is taken off. Finishing processing to a molded surface of the outermost surface 63 is performed by diamond bit cutting so that a hyperfine alternating convex-concave pattern is formed on the mold surface S13. Thus, the mold insert body 61 is completed.

As described above, in the present invention, plating treatment is not performed on the mold surface S11 of the mold insert body 61. The outermost layer 63 is formed by discharge plasma sintering. Hence, it is possible to manufacture the mold insert body 61 easily and in a short period of time. Therefore, it is possible to reduce the cost of the mold insert body 61.

Furthermore, as shown in the following TABLE 1, the coefficient of thermal expansion of SUS 304 used for the base layer 62 is $17.3 \times 10^{-6}$ [1/° K]. The coefficient of thermal expansion of pure nickel used for the outermost layer 63 is $16.3 \times 10^{-6}$ [1/° K]. The coefficient of thermal expansion of zirconia used for the adiabatic layer 64 is $9.4 \times 10^{-6}$ [1/° K]. When the temperature is changed, differences of coefficient of thermal expansion among SUS 304, pure nickel, and zirconia are small. Here, TABLE 1 shows not only the coefficient of thermal expansion but also the coefficient of thermal conductivity and specific heat.

Accordingly, since undesirable stress is not generated at the interface of the base layer 62 and the outermost layer 63 and the adiabatic layer 64 by change of the temperature, a good connection characteristic can be obtained.

TABLE 1

| | Coefficient of thermal expansion [1/° K] | Coefficient of thermal conductivity [W/m · ° K] | Sintering temperature [° C.] | Specific heat [J · kg · K] |
|---|---|---|---|---|
| SUS304 | $17.3 \times 10^{-6}$ | 16.4 | 1000 | 504 |
| Zirconia | $9.4 \times 10^{-6}$ | 2 | 1000–1200 | 0.452 |
| Alumina | $7.6 \times 10^{-6}$ | 30.3 | 1000–1200 | 0.774 |
| Pure Nickel | $16.3 \times 10^{-6}$ | 62.2 | 900–1000 | 594 |

Similarly, the coefficient of thermal expansion of alumina is $7.6 \times 10^{-6}$ [1/° K]. In a case where the temperature of alumina is raised, the differences of the coefficients of thermal expansion among SUS 304, pure nickel, and zirconia are small. Hence, even if alumina is used as the second material, since undesirable stress is not generated at the interfaces of the base layer 62 and the outermost layer 63 and the adiabatic layer 64 by change of the temperature, a good connection characteristic can be obtained.

Furthermore, the sintering temperature of SUS 304 is about 1000 [° C.], the sintering temperature of pure nickel is about 900–1000 [° C.], and the sintering temperature of zirconia is about 1000–1200 [° C.]. Conditions for sintering of SUS 304, pure nickel, and zirconia are equivalent. Therefore, it is possible to make the condition for sintering good so that good connection characteristics can be obtained.

Since the plating treatment is not performed when the outermost layer 63 is formed, a bubble does not enter the outermost layer 63 and a strain is not generated at the outermost layer 63. Therefore, it is possible to manufacture the mold insert body 61 with high precision, and a high yield rate can be obtained. Furthermore, since there is no restriction with regard to materials of the base layer 62, it is possible to manage manufacturing conditions of the mold insert body 61 easily.

In addition, the first inclination layer 65 is formed between the base layer 62 and the adiabatic layer 64. The second inclination layer 66 is formed between the outermost layer 63 and the adiabatic layer 64. Therefore, it is possible to improve connection characteristics of the base layer 62, the outermost layer 63 and the adiabatic layer 64.

In this embodiment, after discharge plasma sintering is performed, finishing processing to the molded surface S13 of the outermost surface 63 is performed by diamond bit cutting so that a pattern of a hyperfine convex-concave is formed on the mold surface S13. Thus, the mold insert body 61 is completed. However, a configuration of the disk shaped substrate, namely a mold pattern corresponding to the convex-concave, may be formed on a surface facing the powder 30 for sintering at the lower end of the upper punch 32. Because of this, finishing processing based on diamond bit cutting can be avoided.

In this embodiment, first, the first through fifth powder layers are formed and the powder 30 for sintering is formed by the first through fifth powder layers. And then, discharge plasma sintering is performed on the powder 30 for sintering. However, the first through fifth powders may be provided and sintered one after another, the powder for sintering formed by a designated powder layer may be formed for every designated powder of the first through fifth powders is provided, and discharge plasma sintering may be performed against the powder for sintering gradually.

Furthermore, in this embodiment, SUS 304 as 50 [mass %] and zirconia as 50 [mass %] are included in the first inclination layer 65. Pure nickel as 50 [mass %] and zirconia 50 [mass %] are included in the second inclination layer 66. However, the first inclination layer 65 and the second inclination layer 66 may each have further a multilayer structure, and the contents of SUS 304 and zirconia at the first inclination layer 65 and the contents of pure nickel and zirconia at the second inclination layer 66 may be changed more gradually and more consecutively.

In this case, for example, the first inclination layer 65 is formed by a layer where SUS 304 as 90 [mass %] and zirconia as 10 [mass %] are included, a layer where SUS 304 as 80 [mass %] and zirconia as 20 [mass %] are included, a layer where SUS 304 as 70 [mass %] and zirconia as 30 [mass %] are included, a layer where SUS 304 as 60 [mass %] and zirconia as 40 [mass %] are included, a layer where SUS 304 as 50 [mass %] and zirconia as 50 [mass %] are included, a layer where SUS 304 as 40 [mass %] and zirconia as 60 [mass %] are included, a layer where SUS 304 as 30 [mass %] and zirconia as 70 [mass %] are included, a layer where SUS 304 as 20 [mass %] and zirconia as 80 [mass %] are included, and a layer where SUS 304 as 10 [mass %] and zirconia as 90 [mass %] are included.

Furthermore, the second inclination layer 66 is formed by a layer where zirconia as 90 [mass %] and pure nickel as 10 [mass %] are included, a layer where zirconia as 80 [mass %] and pure nickel as 20 [mass %] are included, a layer where zirconia as 70 [mass %] and pure nickel as 30 [mass %] are included, a layer where zirconia as 60 [mass %] and pure nickel as 40 [mass %] are included, a layer where zirconia as 50 [mass %] and pure nickel as 50 [mass %] are included, a layer where zirconia as 40 [mass %] and pure nickel as 60 [mass %] are included, a layer where zirconia as 30 [mass %] and pure nickel as 70 [mass %] are included, a layer where zirconia as 20 [mass %] and pure nickel as 80 [mass %] are included, and a layer where zirconia as 10 [mass %] and pure nickel as 90 [mass %] are included.

Thus, it is possible to further improve the connection characteristics of the base layer 62, the outermost layer 63, and the adiabatic layer 64 by making the first inclination layer 65 and the second inclination layer 66 have multilayer structures.

Next, the second embodiment of the present invention will be described.

Figure 7:
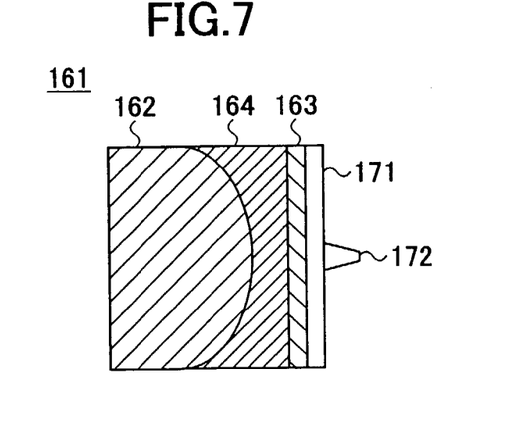
FIG. 7 is a view for explanation of a mold and molded article part of a second embodiment of the present invention.

FIG. 7 is a view for explanation of a mold and molded article part of a second embodiment of the present invention.

In the second embodiment of the present invention, a configuration of a union part of the base layer 162 and the adiabatic layer 164 corresponds to a cooling way of resin in the cavity of the mold, namely a cooling way of resin so as to have substantially equal temperature of respective parts of a molded article when the molded article is taken off from the cavity C.

Referring to FIG. 7, the mold insert body 161 forming a part of the mold includes the base layer 162, the outermost layer 163, and the adiabatic layer 164. The base layer 162 is formed by a first material. The outermost layer 163 is formed by a second material. The adiabatic layer 164 is formed by a third material having a low coefficient of thermal conductivity and functions as an intermediate layer. Here, for convenience for explanation, the first inclination layer 65 and the second inclination layer 66 are omitted in FIG. 7.

The prototype substrate 171 is provided inside of the cavity C shown in FIG. 6. The sprue part 172 is provided inside of the sprue 81 shown in FIG. 6. The prototype substrate 171 and the sprue part 172 form a molded article part.

In a case where a disk shaped substrate is molded as a molded article, the mold insert body 161 is used for a stamper where a pattern formed by a hyperfine convex-concave is formed on the mold surface. The mold insert body 161 is set to the mold apparatus 71 shown in FIG. 6 and the resin as a molding material fills the inside of the cavity C of the mold apparatus 71. When the resin is cooled, the prototype substrate 171 is formed. At this time, the pattern is transferred to the prototype substrate 171.

Referring to FIG. 6, the resin injected from the injection nozzle 83 fills the cavity C via the sprue 81 and the gate 82. In the cavity C, the resin flows from a vicinity of the gate 82 and the sprue 81 to parts remote from the gate 82 and the sprue 81 (in this embodiment, from a center part of the cavity C to the peripheral part of the cavity C). Therefore, when the resin flows inside of the cavity C so as to be cooled by the mold plates 74 and 76, as being positioned near the center part, the temperature of the resin is high; as being positioned near the peripheral part, a temperature of the resin is low.

In this embodiment, the thickness of the adiabatic layer 164 shown in FIG. 7 is partially varied. That is, a configuration of a union part of the base layer 162 and the adiabatic layer 164 corresponds to a cooling way of resin in a cavity of the mold, namely a cooling way of resin so as to have substantially equal temperature of respective parts of a molded article when the molded article is taken off from the cavity space C. More specifically, the thickness of the adiabatic layer 164 is gradually increased from the center part to the peripheral part.

Therefore, the cooling rate is set to be high as being positioned close to the center part. The cooling rate is set to be low as being positioned close to the peripheral part. Therefore, the temperature distribution of the resin becomes equal in a diameter direction (from a center part to a peripheral part), and thereby it is possible to avoid a generation of strain of the molded article based on a difference of a temperature after the molded article is taken off from the cavity C. Hence, it is possible to transfer the pattern with high precision and improve the quality of the disk shaped substrate. Furthermore, since it is possible to equalize the distribution of birefringence ratio representing a performance of the disk shaped substrate in a diameter direction, it is possible to further improve the quality of the disk shaped substrate.

In this embodiment, in order to correspond to a cooling way of resin in a cavity of the mold, namely a cooling way of resin so as to have substantially equal temperature of respective parts of a molded article when the molded article is taken off from the cavity C, the thickness of the adiabatic layer 164 is increased from the center part to the peripheral part.

However, the present invention is not limited to being applied as in the above; a configuration of a union part of the base layer 162 and the adiabatic layer 164 may be set based on the following two conditions.

As the first condition, the thickness of the cavity C should be considered.

Figure 8:
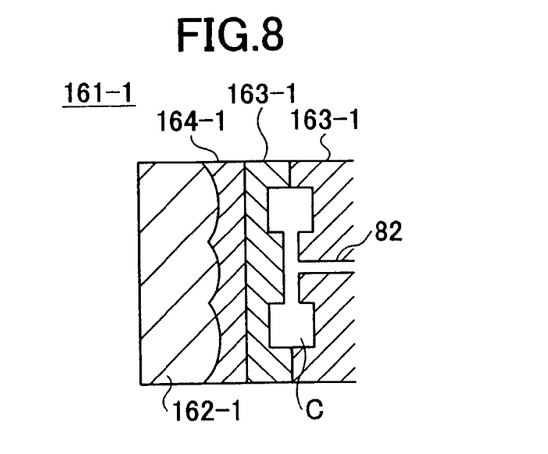
FIG. 8 is a view for explanation of a first deformation example of the mold of the second embodiment of the present invention.

FIG. 8 is a view for explanation of a first deformation example of the mold of the second embodiment of the present invention. Referring to FIG. 8, a mold insert body 161-1 of a first deformation example of the mold of the second embodiment of the present invention includes a base layer 162-1, an outermost layer 163-1 and an adiabatic layer 164-1.

As shown in FIG. 8, when the resin flows from the gate 82 and moves into the cavity C, if a thickness of the cavity C in a direction perpendicular to a moving direction is not equal, it is necessary to change the thickness of the adiabatic layer 164-1. As the thickness of the cavity C is increased, the cooling rate of the resin is slowed and therefore it is necessary to make the thickness of the adiabatic layer 164-1 less.

However, even if the thickness of the cavity C is uniform, the cooling rate against respective parts inside of the cavity C of the resin is different based on the thickness of the molded article.

Figure 9:
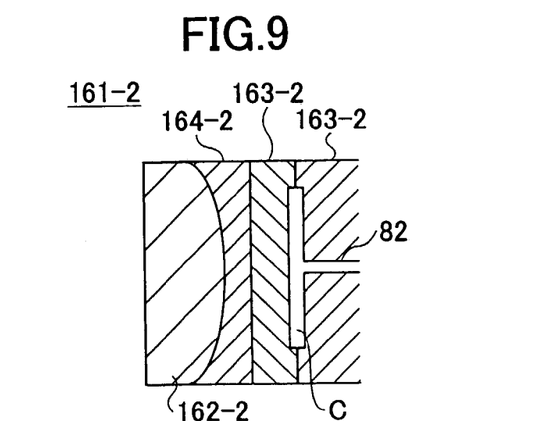
FIG. 9 is a view for explanation of a second deformation example of the mold of the second embodiment of the present invention.
Figure 10:
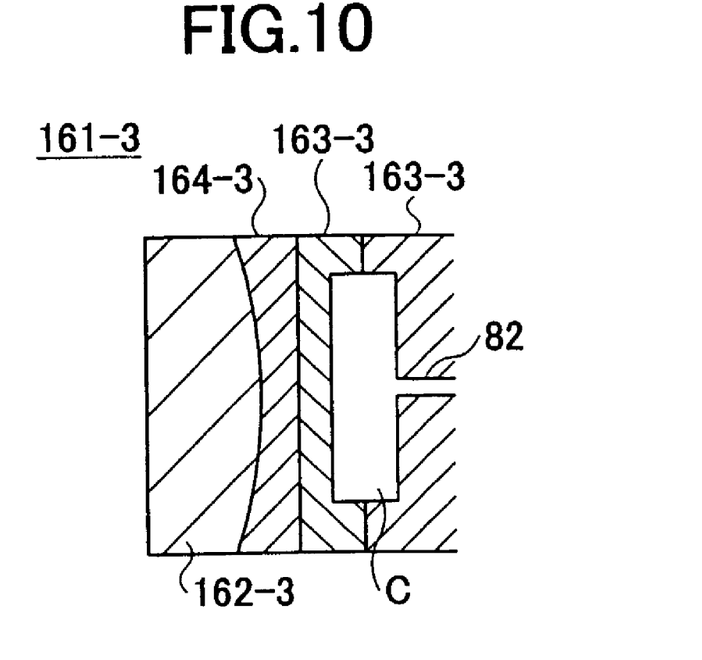
FIG. 10 is a view for explanation of a third deformation example of the mold of the second embodiment of the present invention.

FIG. 9 is a view for explanation of a second deformation example of the mold of the second embodiment of the present invention. Referring to FIG. 9, a mold insert body 161-2 of a second deformation example of the mold of the second embodiment of the present invention includes a base layer 162-2, an outermost layer 163-2 and an adiabatic layer 164-2 and is used for manufacturing a thin walled product such as a Digital Video Disk (DVD) or a Compact Disk (CD). FIG. 10 is a view for explanation of a third deformation example of the mold of the second embodiment of the present invention. Referring to FIG. 10, a mold insert body 161-3 of a third deformation example of the mold of the second embodiment of the present invention includes a base layer 162-3, an outermost layer 163-3 and an adiabatic layer 164-3 and is used for manufacturing a thick walled product thicker than the Digital Video Disk (DVD) or the Compact Disk (CD).

Meanwhile, when the resin fills from the gate 82 to the cavity C, the thin layer called the skin layer is formed on an inside wall of the cavity C from the vicinity of the gate 82, so that the skin layer is cooled and performs solid soon. Since the resin flows an inside of the skin layer, as shown in FIG. 9, as the cavity C becomes thinner, the resin is cooled. Hence, the difference of the cooling rate of the resin against respective parts in the cavity C become greater. As being farther from the gate 82, it is necessary to make the thickness of the adiabatic layer 164-2 greater.

On the other hand, as shown in FIG. 10, as the thickness of the cavity C is greater, the differences of the cooling rates of the resin against respective parts in the cavity C become less. That is, there is little difference between the cooling rates in the vicinity of the gate 82 and the far point from the gate 82. Hence, it is not necessary to vary the thickness of the adiabatic layer 164-3 as compared with the adiabatic layer 164-2 shown in FIG. 2.

As a second condition, when the resin flows in the cavity C, it is necessary to consider the difference of the temperature of the resin against respective parts of the cavity C.

Figure 11:
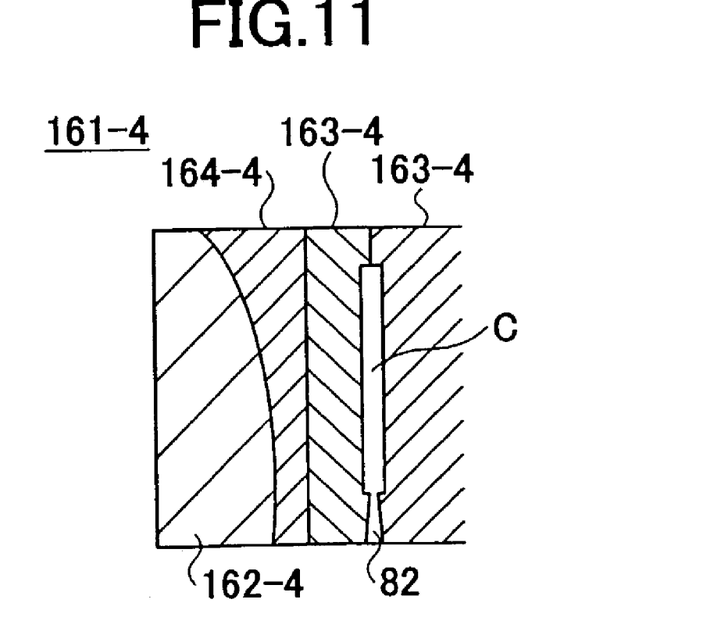
FIG. 11 is a view for explanation of a fourth deformation example of the mold of the second embodiment of the present invention.

FIG. 11 is a view for explanation of a fourth deformation example of the mold of the second embodiment of the present invention. Referring to FIG. 11, a mold insert body 161-4 of the fourth deformation example of the mold of the second embodiment of the present invention includes a base layer 162-4, an outermost layer 163-4, and an adiabatic layer 164-4. When the resin flows in the cavity C, the resin passes through the gate 82. Therefore, since the resin flows in the vicinity of the gate 82 in the cavity C last when the resin fills in the cavity C, the temperature of the resin in the vicinity of the gate 82 is high. As being further from the gate 82, the temperature of the resin is lower. Hence, as being farther from the gate, it is necessary to make the thickness of the adiabatic layer 164-4 greater.

Next, a third embodiment of the present invention, which applies to a mold for molding a lens made of plastic as a molded article, will be described.

Figure 12:
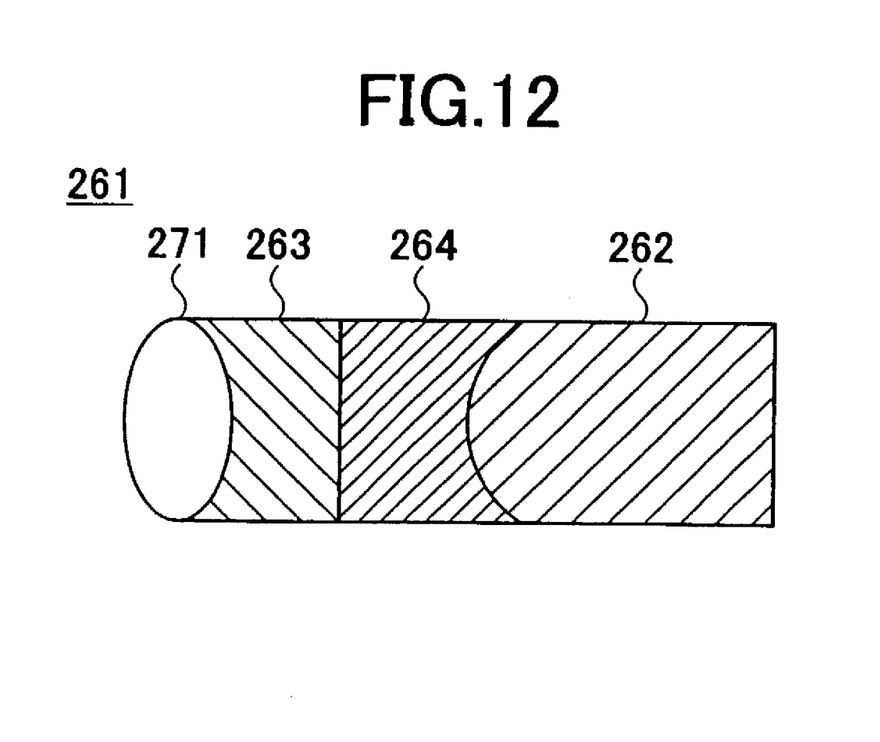
FIG. 12 is a view for explanation of a mold and molded article part of a third embodiment of the present invention.

FIG. 12 is a view for explanation of a first deformation example of the mold of the third embodiment of the present invention.

Referring to FIG. 12, a mold insert body 261 forming a part of the mold includes a base layer 262, an outermost layer 263, and an adiabatic layer 264. The base layer 262 is made of a first material. The outermost layer 263 is made of a second material. The adiabatic layer 264 is made of a third material having a low coefficient of thermal conductivity and functions as an intermediate layer.

The lens 271 as a molded article is manufactured by a mold having the above mentioned structure. Here, the lens 271 is a convex lens. That is, the lens 271 has a structure where as being closer to a center part, the thickness is greater, and as being closer to an end part, the thickness is less.

According to the mold insert body 11 of the related art shown in FIG. 1, as being close to a center part where the thickness of the resin as a molding material is greater, the cooling rate of the resin is lower. As being close to an end part where the thickness of the resin as a molding material is thin, the cooling rate of the resin is higher. As a result of this, as being close to the center part of the lens 271, the temperature of the resin is higher. As being close to the end part of the lens 271, the temperature of the resin is lower so that the temperature distribution of the resin and the coefficient of contraction are non-uniform.

In this embodiment, the thickness of the adiabatic layer 264 corresponds to a cooling way of resin in a cavity C of the mold, namely a cooling way of resin so as to have substantially equal temperature of respective parts of a molded article when the molded article is taken off from the cavity C of FIG. 6. The thickness of the adiabatic layer 264 is gradually increased from the center part to the end part.

Accordingly, as being closer to the center part, the cooling rate is higher. As being closer to the end part, the cooling rate is lower. Therefore, the temperature distribution of the resin in the diameter direction (from the center part to the end part) is constant, and the coefficient of contraction is also constant in the diameter direction.

As a result of this, precision of the configuration (for example, a curved surface such as a spherical surface, and a non-spherical surface, and a plane surface, etc.) of the surface of the lens 271 can be improved so that the quality of the lens 271 can be improved.

Next, a fourth embodiment of the present invention, which applies to a mold for molding a lens made of plastic as a molded article, will be described.

Figure 13:
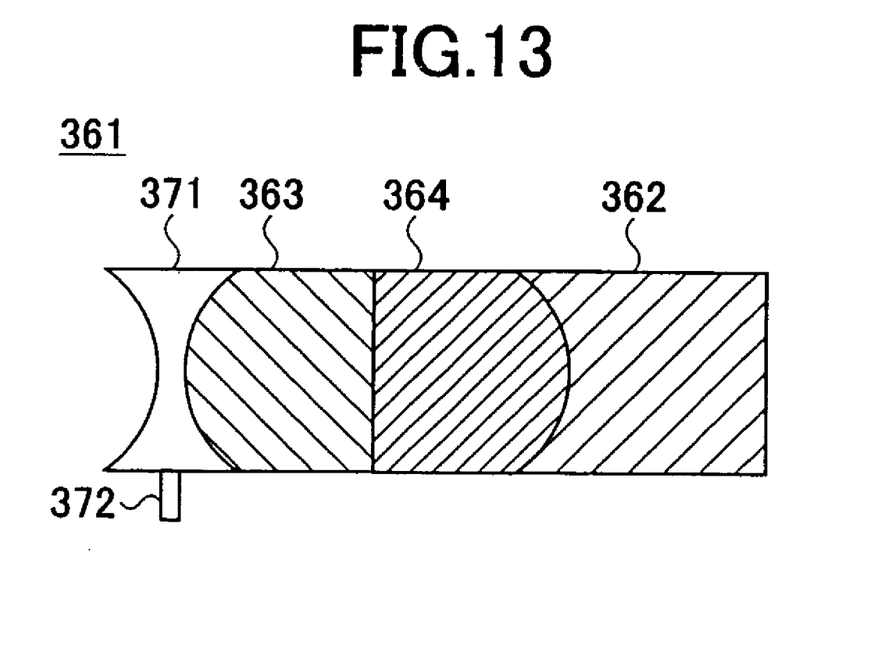
FIG. 13 is a view for explanation of a mold and molded article part of a fourth embodiment of the present invention.

FIG. 13 is a view for explanation of a first deformation example of the mold of the fourth embodiment of the present invention.

Referring to FIG. 13, a mold insert body 361 forming a part of the mold includes a base layer 362, an outermost layer 363, and an adiabatic layer 364. The base layer 362 is made of a first material. The outermost layer 363 is made of a second material. The adiabatic layer 364 is made of a third material having a low coefficient of thermal conductivity and functions as an intermediate layer. The gate part 372 is formed in the gate 82 shown in FIG. 6.

The lens 371 as a molded article is manufactured by a mold having the above mentioned structure. Here, the lens 371 is a concave lens. That is, the lens 271 has a structure where as being closer to the center part, the thickness is less, and as being closer to an end part, the thickness is greater.

According to the mold insert body 11 of the related art shown in FIG. 1, since the coefficient of thermal conductivity is uniform, as being closer to the center part where the thickness of the resin as a molding material is less, the cooling rate of the resin is higher. As being closer to an end part where the thickness of the resin as a molding material is greater, the cooling rate of the resin is lower. As a result of this, as being closer to the center part of the lens 371, the temperature of the resin is lower. Hence, if the gate is formed at a circumference of the cavity C, as being closer to the center part it is difficult for the resin to flow. As being closer to the circumference part it is easy for the resin to flow, and therefore a weld line is formed at an end part of flowing of the resin at a side opposite to the gate.

In this embodiment, the adiabatic layer 364 has a configuration where the thickness is gradually less as being from the center part to the circumference part so as to correspond to the temperature distribution of the resin in the cavity C.

As being closer to the center part, the cooling rate of the resin becomes lower and the temperature is higher. As being closer to the circumference part, the cooling rate of the resin becomes higher and the temperature is lower. Hence, the temperature distribution of the resin becomes constant in a diameter direction (from the center part to the circumference part). As a result of this, a weld line is prevented from being formed so that the quality of the lens 371 can be improved.

Thus, the mold of the present invention has the mold insert body made of two kinds of materials having different coefficients of thermal conductivity.

The union part is formed by sintering respective materials. Therefore, it is possible to reduce time for manufacturing the mold so that reducing the cost for the mold can be obtained.

Furthermore, a configuration of the union part corresponds to a cooling way of the resin in the cavity space of the mold, namely a cooling way of the resin so as to have substantially equal temperature of respective parts of the molded article when the molded article is taken off from the cavity. Accordingly, when the molded article is molded, the temperature distribution of the molding material is uniform. As a result of this, it is possible to manufacture the molded article stably with high precision so as to improve the quality of the molded article.

Furthermore, since plating treatment is not performed in the present invention, it is possible to manufacture the mold with high precision so that a high yield rate can be achieved. Therefore, a connection characteristic of two different materials can be improved. Furthermore, since the material of a layer is not restricted, it is possible to manage a manufacturing condition of the mold easily.

The present invention is not limited to these embodiments, but variations and modifications may be made without departing from the scope of the present invention.

For example, in the above respective embodiments, a material having a low coefficient of thermal conductivity is used for the intermediate layer. However, a material having a high coefficient of thermal conductivity may be used and a configuration of a union part may correspond to a cooling way of resin in a cavity C of the mold, namely a cooling way of resin so as to have substantially equal temperatures of respective parts of a molded article when the molded article is taken off from the cavity C.

Furthermore, in the mold having a two layer structure wherein the base layer and the outermost layer are formed, materials having different coefficients of thermal conductivity may be used for respective layers, and a configuration of a union part may correspond to a cooling way of resin in a cavity of the mold, namely a cooling way of resin so as to have substantially equal temperatures of respective parts of a molded article when the molded article is taken off from the cavity space C.

Furthermore, in the above mentioned embodiment, the molded product having a relatively simple cross sectional configuration such as a disk or a lens is described. However, the present invention can be applied for manufacturing of an unsymmetrical configuration type molded article, a container having a deep bottom, and a thick walled molded article for which a relatively long period of cooling time is required at the time of molding. That is, the above mentioned molded article may be molded by using at least two kinds of materials having different coefficients of thermal conductivity and by having corresponding configuration of a union part to a cooling way of resin in a cavity of the mold, namely a cooling way of resin so as to have substantially equal temperature of respective parts of a molded article when the molded article is taken off from the cavity space C.

This patent application is based on Japanese priority patent application No. 2002-160544 filed on May 31, 2002, the entire contents of which are hereby incorporated by reference.

What is claimed is:

1. A mold, comprising a mold insert body having an outermost layer forming a flat surface, the mold insert body made of at least two kinds of materials, the materials having different coefficients of thermal conductivity,
   wherein the mold insert body includes a union part formed by sintering the materials,
   the union part has a configuration set so as to correspond to a cooling way of a molding material flowed in a cavity forming part of the mold, so that a thickness of the union part is nonlinearly and gradually increased from a center part of the union part to a peripheral part of the union part, and
   the union part includes an inclination layer having a multilayer structure where contents of materials included in the union part are varied at a designated rate.

2. The mold as claimed in claim 1, wherein
   the configuration of the union part is formed so as to correspond to a distribution of a temperature of a molding material in a cavity forming part.

3. The mold as claimed in claim 1, wherein
   the configuration of the union part is formed based on a cooling rate of the molding material.

4. The mold as claimed in claim 1, wherein
   the union part includes a plurality of layers having different contents of the respective materials, and
   a control of the temperature is based upon the thermal conductivity of the materials.

5. A mold, comprising a mold insert body, having an outermost layer forming a flat surface,
   the mold insert body including:
   a base layer that is made of a first material; and
   an outermost layer that is made of a second material different from the first material of the base layer and that forms a cavity forming part,
   wherein a union part is formed by sintering the base layer and the outermost layer,
   the union part has a configuration set so as to correspond to a cooling way of a molding material flowed in the cavity forming part of the mold, so that a thickness of the union part is nonlinearly and gradually increased from a center part of the union part to a peripheral part of the union part, and
   the union part includes an inclination layer having a multilayer structure where contents of materials included in the union part are varied at a designated rate.

6. The mold as claimed in claim 5, wherein
   the configuration of the union part is formed so as to correspond to a distribution of the temperature of the molding material in the cavity forming part.

7. The mold as claimed in claim 5, wherein
   the configuration of the union part is formed based on a cooling rate of the molding material.

8. The mold as claimed in claim 5, wherein
   the mold insert body further includes an intermediate layer,
   the intermediate layer is formed between the base layer and the outermost layer, and is made of a third material having a coefficient of thermal conductivity different from the first material of the base layer and the second material of the outermost layer.

9. The mold as claimed in claim 5, wherein
   the intermediate layer is formed by a plurality of layers.

10. The mold as claimed in claim 5, wherein
    the union part includes a plurality of layers having different contents of the respective materials.

11. A mold, comprising a mold insert body having an outermost layer forming a convex-shaped surface, the mold insert body made of at least two kinds of materials, the materials having different coefficients of thermal conductivity,
    wherein the mold insert body includes a union part formed, and
    a thickness of the union part is nonlinearly and gradually increased from a center part of the union part to an end part of the union part.

12. A mold, comprising a mold insert body having an outermost layer forming a concave-shaped surface, the mold insert body made of at least two kinds of materials, the materials having different coefficients of thermal conductivity,
    wherein the mold insert body includes a union part formed, and
    a thickness of the union part is nonlinearly and gradually decreased from a center part of the union part to a circumference part of the union part.

13. A mold, comprising a mold insert body having a gate provided at a side surface of a cavity forming part, the mold insert body made of at least two kinds of materials, the materials having different coefficients of thermal conductivity,
    wherein the mold insert body includes a union part formed by sintering the materials,
    the union part has a configuration set so as to correspond to a cooling way of a molding material flowed in the cavity forming part of the mold, so that a thickness of the union part is nonlinearly and gradually increased from a center of the union part to a peripheral part of the union part, and
    the union part includes an inclination layer having a multilayer structure where contents of materials included in the union part are varied at a designated rate.

* * * * *